United States Patent
Chou et al.

(10) Patent No.: US 9,317,104 B2
(45) Date of Patent: *Apr. 19, 2016

(54) SERVER CLUSTER AND CONTROL MECHANISM THEREOF

(71) Applicant: Quanta Computer Inc., Tao Yuan Shien (TW)

(72) Inventors: Le-Sheng Chou, Taoyuan County (TW); Sz-Chin Shih, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,814

(22) Filed: Aug. 8, 2014

(65) Prior Publication Data

US 2015/0033058 A1  Jan. 29, 2015

Related U.S. Application Data

(63) Continuation of application No. 13/449,655, filed on Apr. 18, 2012, now Pat. No. 8,806,252.

(30) Foreign Application Priority Data

Sep. 29, 2011 (TW) .............................. 100135347 A

(51) Int. Cl.
 *G06F 1/32* (2006.01)
 *H04L 12/931* (2013.01)
 *H04L 12/24* (2006.01)
 (Continued)

(52) U.S. Cl.
 CPC .............. *G06F 1/3287* (2013.01); *G06F 11/00* (2013.01); *H04L 12/24* (2013.01); *H04L 12/26* (2013.01); *H04L 49/356* (2013.01)

(58) Field of Classification Search
 CPC ....... G06F 11/00; G06F 1/3287; H04L 12/24; H04L 12/26; H04L 49/356
 See application file for complete search history.

(56) References Cited

U.S. PATENT DOCUMENTS

| 6,426,571 | B1 | 7/2002 | Doron |
| 8,806,252 | B2 * | 8/2014 | Chou et al. ..................... 713/324 |
| 8,819,469 | B2 * | 8/2014 | Chou et al. ..................... 713/324 |

(Continued)

FOREIGN PATENT DOCUMENTS

| CN | 1578298 A | 2/2005 |
| EP | 1 081 823 A2 | 3/2001 |

(Continued)

OTHER PUBLICATIONS

English abstract for JPH0594236 (A); published Apr. 16, 1993.

(Continued)

*Primary Examiner* — M Elamin
(74) *Attorney, Agent, or Firm* — Polsinelli PC

(57) ABSTRACT

A server cluster including a network switch and multiple server nodes is provided. The network switch is connected to an external network. Each server node includes a network port, a network chip and a control unit. The network port is connected to the network switch via a cable. The network chip detects the cable to obtain a connection state with the external network at the server node after the network switch is started, and accordingly outputs a connection state signal. The control unit turns on or shuts down the server node according to the connection state signal and an on/off state of the server node.

16 Claims, 5 Drawing Sheets

(51) Int. Cl.
*H04L 12/26* (2006.01)
*G06F 11/00* (2006.01)

(56) References Cited

U.S. PATENT DOCUMENTS

2004/0268157 A1   12/2004  Dake et al.
2008/0030078 A1    2/2008  Whitted et al.
2011/0161695 A1*  6/2011  Okita et al. .................. 713/310

FOREIGN PATENT DOCUMENTS

JP     H 0594236 A    4/1993
TW   200803113 A    1/2008

OTHER PUBLICATIONS

Office Action mailed Aug. 26, 2014; in corresponding Chinese patent application No. 201110247963.8.

* cited by examiner

SERVER CLUSTER AND CONTROL MECHANISM THEREOF

This application is a continuation application of co-pending application Ser. No. 13/449,655, filed on Apr. 18, 2012, now U.S. Pat. No. 8,806,252 the contents of which are incorporated herein by reference. This application claims the benefit of Taiwan application Serial No. 100135347, filed Sep. 29, 2011, the subject matter of which is incorporated herein by reference.

BACKGROUND OF THE INVENTION

1. Field of the Invention

The invention relates in general to a server cluster and a control mechanism thereof.

2. Description of the Related Art

The blade server is optimized with modular design to reduce the physical space and energy to a minimum and further simplify the server configuration. However, when abnormal disconnection occurs to the network of the data center in which the blade server is located, the operation of the blade server relies on manual operation, or, the administrator can turn off the power of the blade server with a remote-end management server. However, the aforementioned mechanism cannot instantly respond to the disconnection state of the network, and is thus unable to save power for the blade server.

SUMMARY OF THE INVENTION

The invention is directed to a server cluster and a control mechanism thereof. A network connection state at the server node is detected, and the power of the server node is automatically turned on and shut down with a logic circuit, so that automatic control is achieved for saving power.

According to a first aspect of the present invention, a server cluster including a network switch and multiple server nodes is provided. The network switch is connected to an external network. Each server node includes a network port, a network chip and a control unit. The network port is connected to the network switch via a cable. The network chip detects the cable to obtain a connection state with the external network at the server node after the network switch is started, and accordingly outputs a connection state signal. The control unit turns on or shuts down the server node according to the connection state signal and an on/off state of the server node.

According to a second first aspect of the present invention, a control mechanism of a server cluster is provided. The server cluster includes a network switch and multiple server nodes. Each server node includes a network port, a network chip and a control unit. The network switch is connected to an external network. The network port is connected to the network switch via a cable. The control mechanism includes the following steps. A network switch is started. A network chip is used for detecting the cable to obtain a connection state with an external network at a server node and accordingly outputting a connection state signal. The control unit is used for turning on or shutting down the server node according to the connection state signal and an on/off state of the server node.

The above and other aspects of the invention will become better understood with regard to the following detailed description of the preferred but non-limiting embodiment(s). The following description is made with reference to the accompanying drawings.

DETAILED DESCRIPTION OF THE INVENTION

The invention provides a server cluster and a control mechanism thereof. A network connection state at the server node is detected, and the power of the server node is automatically turned on and shut down with a logic circuit, so that automatic control is achieved for saving power.

Figure 1A:
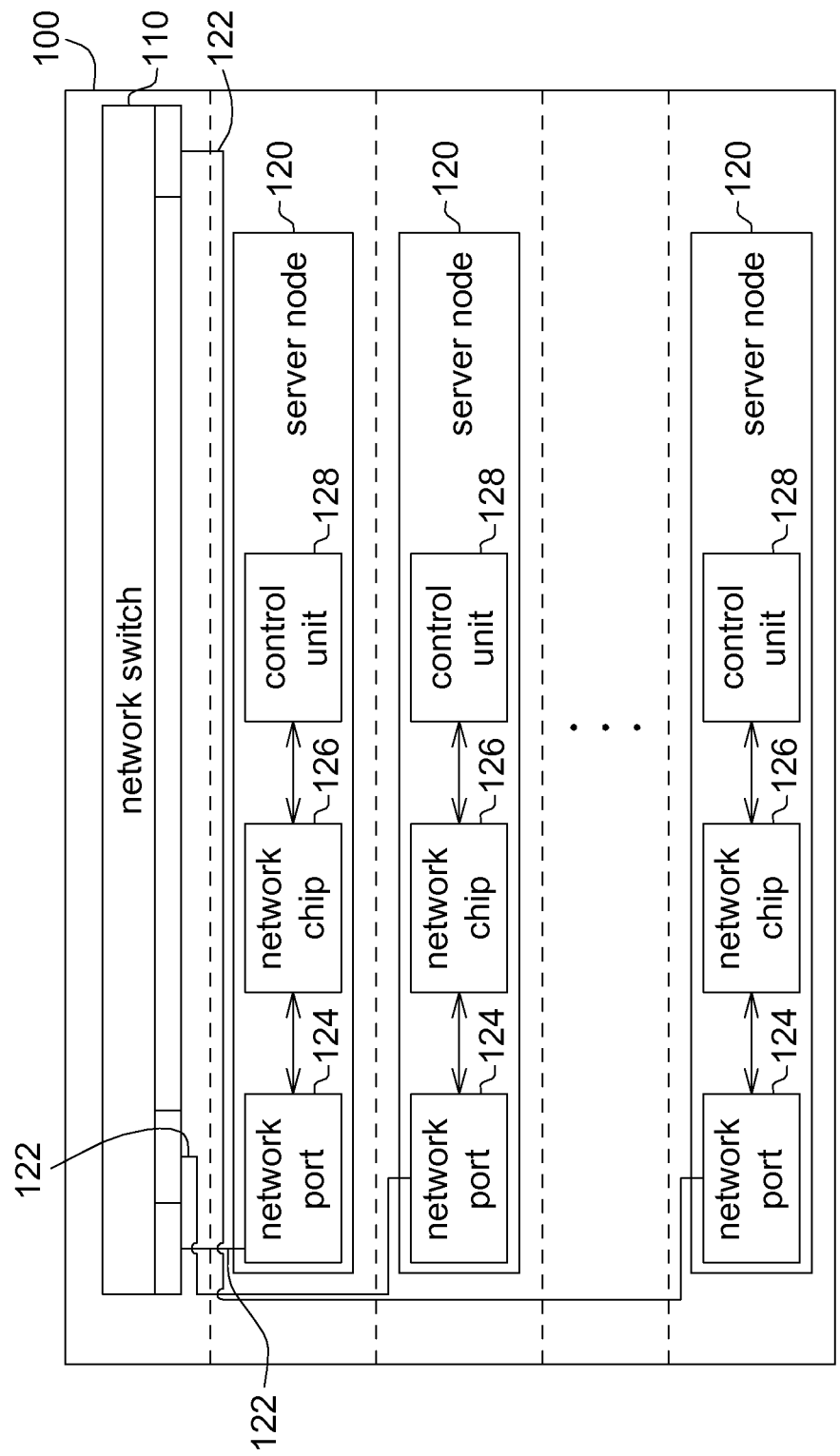
FIG. 1A shows a server cluster according to one embodiment of the invention.

Referring to FIG. 1A, a server cluster according to one embodiment of the invention is shown. The server cluster 100 includes a network switch 110 and multiple server nodes 120. The network switch 110 is connected to an external network such as an Internet. Each server node 120 includes a network port 124, a network chip 126 and a control unit 128. The network port 124 is connected to the network switch 110 via a cable 122. The network chip 126, through the cable 122, obtains a connection state with the external network at the server node 120 after the network switch 110 is turned on, and accordingly outputs a connection state signal LINK_LED_L. The control unit 128 turns on or shuts down the server node 120 according to the connection state signal LINK_LED_L and an on/off state of the server node 120.

Figure 1B:
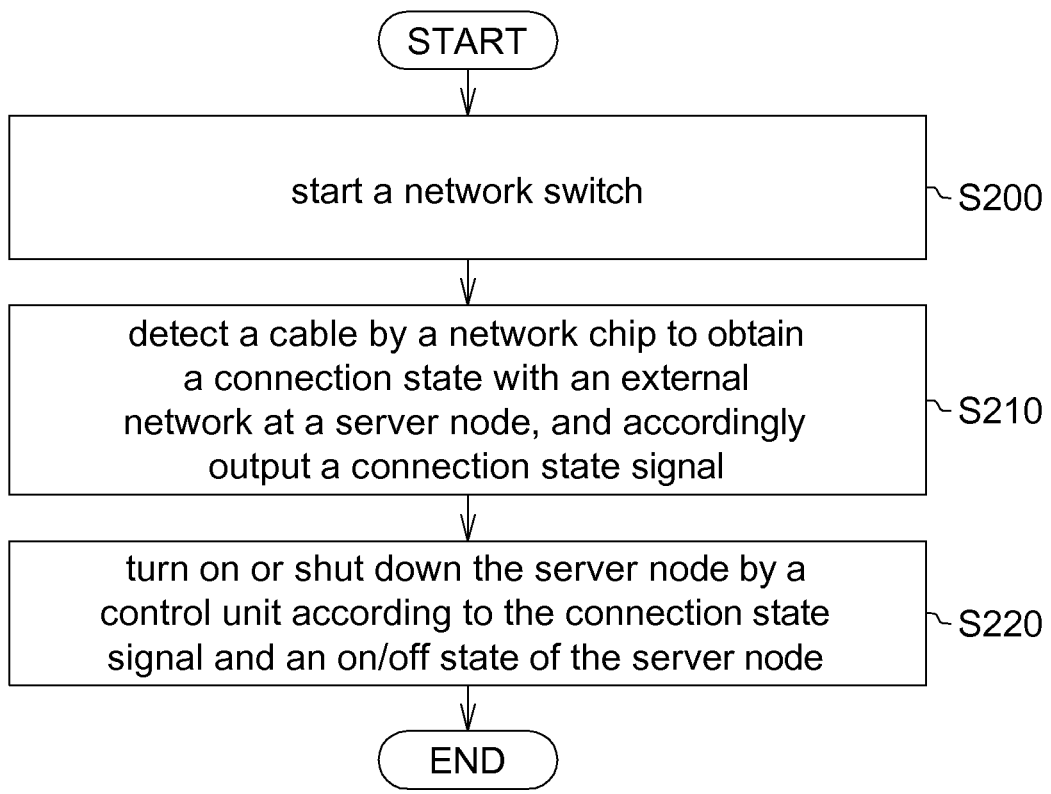
FIG. 1B shows a flowchart of a control mechanism of a server cluster according to one embodiment of the invention.

In response to the server cluster 100, the invention also provides a control mechanism of a server cluster. Referring to FIG. 1B, a flowchart of a control mechanism of a server cluster according to one embodiment of the invention is shown. In step S200, a network switch 110 is started. In step S210, a network chip 124, through a cable 122, obtains a connection state with an external network at a server node 120, and accordingly outputs a connection state signal LINK_LED_L. In step S220, a control unit 128 turns on or shuts down the server node 120 according to the connection state signal LINK_LED_L and an on/off state of the server node 120.

Figure 2A:
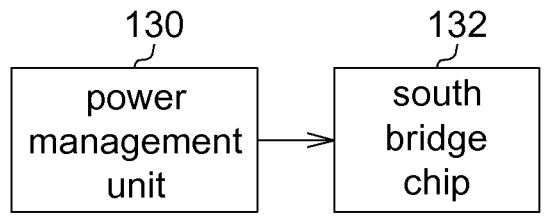
FIG. 2A shows a block diagram of a control unit according to one embodiment of the invention.

Referring to FIG. 2A, a block diagram of a control unit according to one embodiment of the invention is shown. The control unit 128 includes a power management unit 130 and a south bridge chip 132. The power management unit 130 is realized by such as a baseboard management controller (BMC) or a complex programmable logic device (CPLD). The power management unit 130 outputs a power signal PWR_BUT_L according to the connection state signal LINK_LED_L. The south bridge chip 132 turns on or shuts down the server node 120 according to the power signal PWR_BUT_L and an on/off state of the server node 120.

Figure 2B:
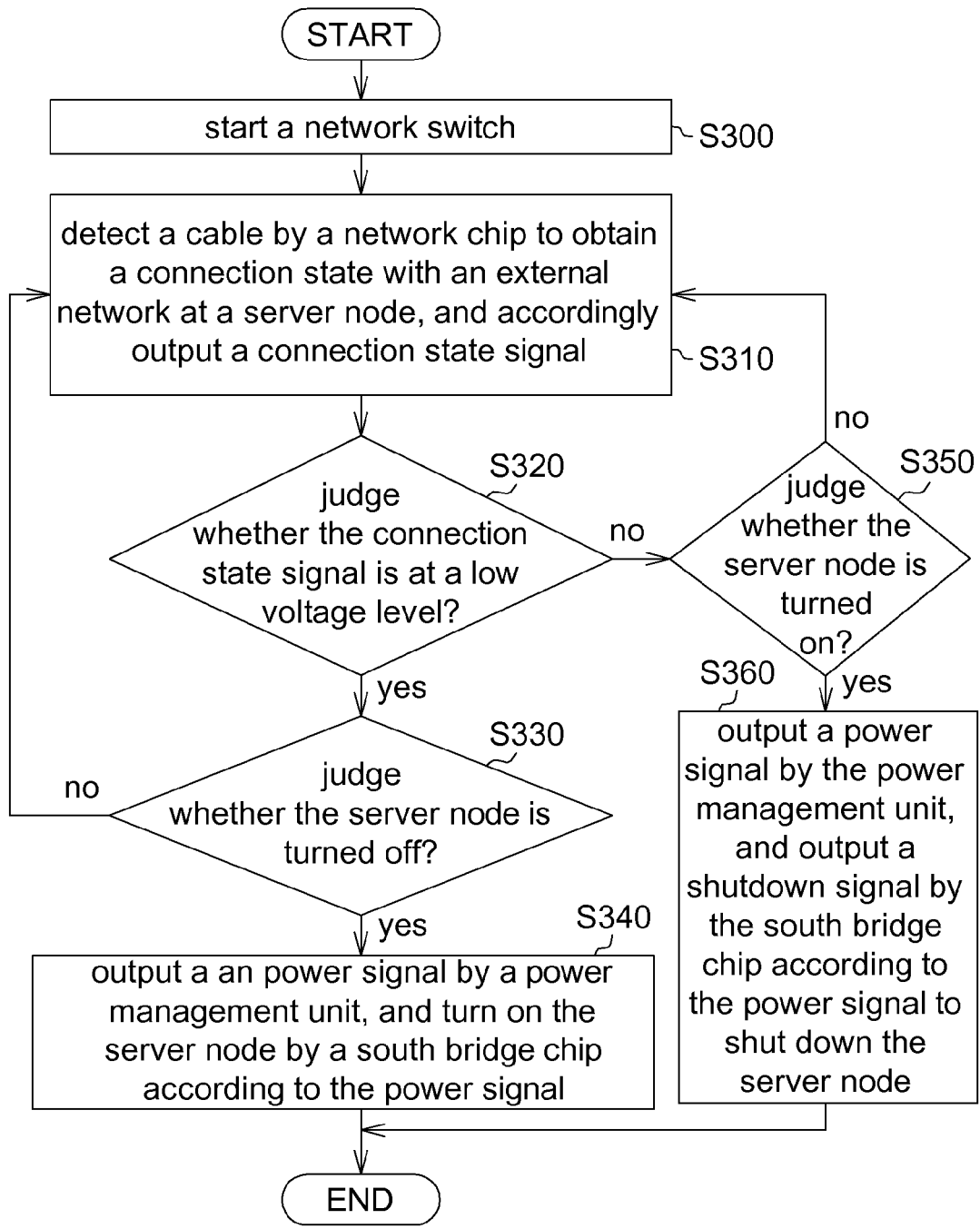
FIG. 2B shows a detailed flowchart of a control mechanism of a server cluster according to one embodiment of the invention.

Referring to FIG. 2B, a detailed flowchart of a control mechanism of a server cluster according to one embodiment of the invention is shown. In step S300, a network switch 110 is started. In step S310, after handshake protocols between the network chip 124 and the network switch 110, a network chip 124 detects a cable 122 connected to the network switch 110 to obtain a connection state with an external network at a server node 120, and accordingly outputs a connection state signal LINK_LED_L. For example, if the connection state signal LINK_LED_L is at a low voltage level, this indicates a connection state; if the connection state signal LINK_LED_L is at a high voltage level, this indicates a disconnection state.

In step S320, whether the connection state signal LINK_LED_L is at a low voltage level is judged. If the connection state signal LINK_LED_L is at a low voltage level, this indicates a connection state, then the process proceeds to step S330. In step S330, whether the server node 120 is turned off is judged. If the server node 120 is turned on, this indicates that the server node 120 is turned on and connected to the external network, then no further action is needed and the process returns to step S310. If the server node 120 is turned off, this indicates that the server node 120 is turned off but is connected to the external network, then the process proceeds to step S340. In step S340, a power management unit 130 outputs a an power signal PWR_BUT_L being, for example, at a low voltage level, and a south bridge chip 132 turns on the server node 120 according to the power signal PWR_BUT_L being at the low voltage level. In one embodiment, the power signal PWR_BUT_L could be set as high voltage level to direct the south bridge chip 132 to turn on the server node 120.

If the connection state signal LINK_LED_L is judged as being at a high voltage level in step S320, this indicates that the server node is not connected to the external network, then the process proceeds to step S350. In step S350, whether the server node 120 is turned on is judged. If the server node 120 is turned off, this indicates that the server node 120 is turned off and is disconnected from the external network, then no action is generated and the process returns to step S310. If the server node 120 is turned on, this indicates that the server node 120 is turned on but is disconnected from the external network, then the process proceeds to step S360. In step S360, the power management unit 130 outputs a power signal PWR_BUT_L being such as at a low voltage level, and the south bridge chip 132 outputs a shutdown signal according to the power signal PWR_BUT_L being at a low voltage level to shut down the server node 120. In one embodiment, the power signal PWR_BUT_L could be set as high voltage level to direct the south bridge chip 132 to shut down the server node 120.

Figure 3A:
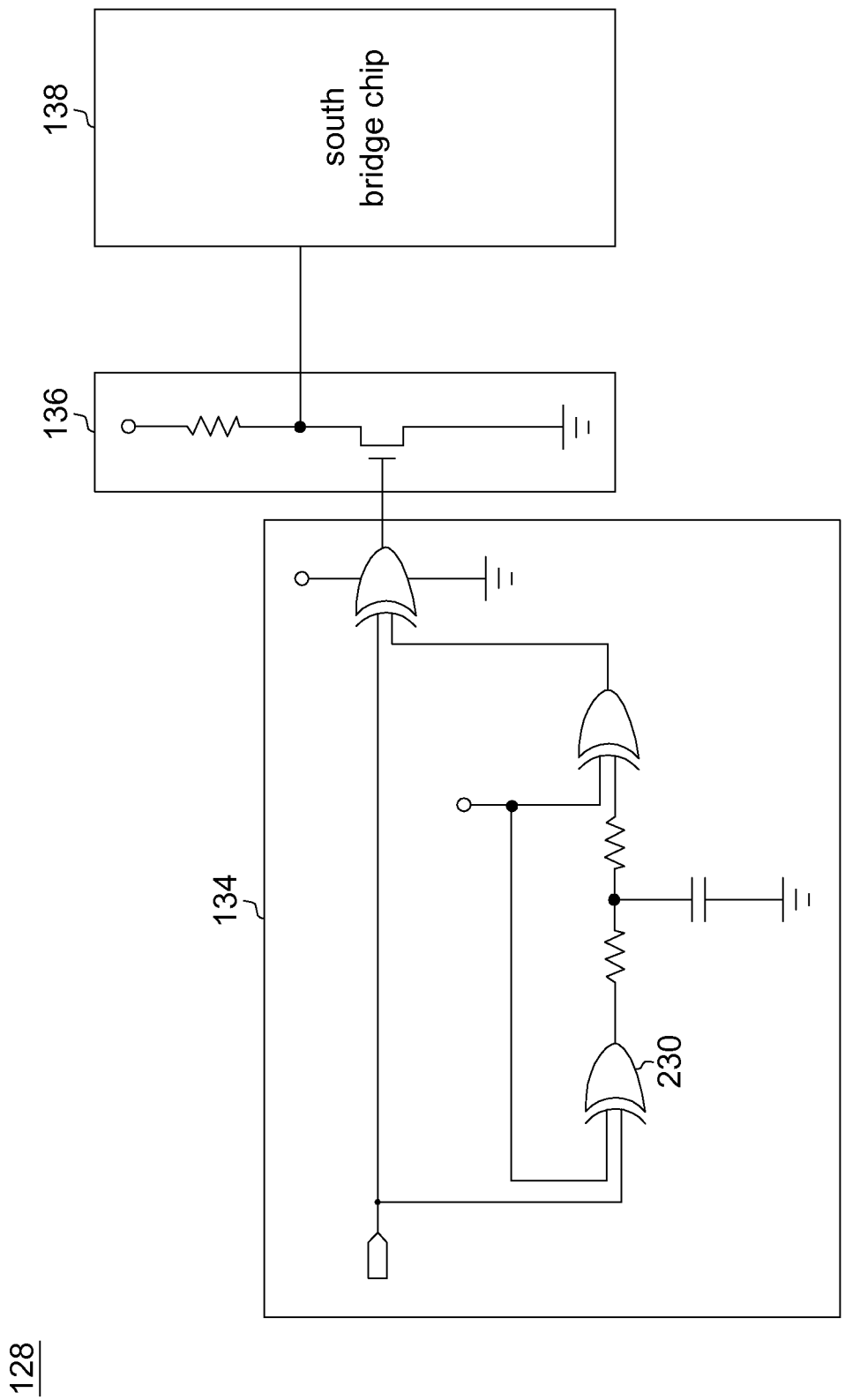
FIG. 3A shows a block diagram of a control unit according to another embodiment of the invention.

Referring to FIG. 3A, a block diagram of a control unit according to another embodiment of the invention is shown. The control unit 128 includes a dual edge detector 134, an inverter 136 and a south bridge chip 138. The dual edge detector 134 outputs a level signal when the voltage level of the connection state signal LINK_LED_L varies. The inverter 136 inverts a level signal into a power signal PWR_BUT_L. The south bridge chip 138 turns on or shuts down the server node 120 according to the power signal PWR_BUT_L and an on/off state of the server node 120. The inverter 136 is optionally used and the use of the inverter 136 is based on the enable signal received by the south bridge chip 138. In other words, if the signal LINK_LED_L outputted from the dual edge detector 134 can be received and understood by the south bridge chip 138 for directly turning on or shutting down the server node 120, then the inverter 136 can be omitted.

Figure 3B:
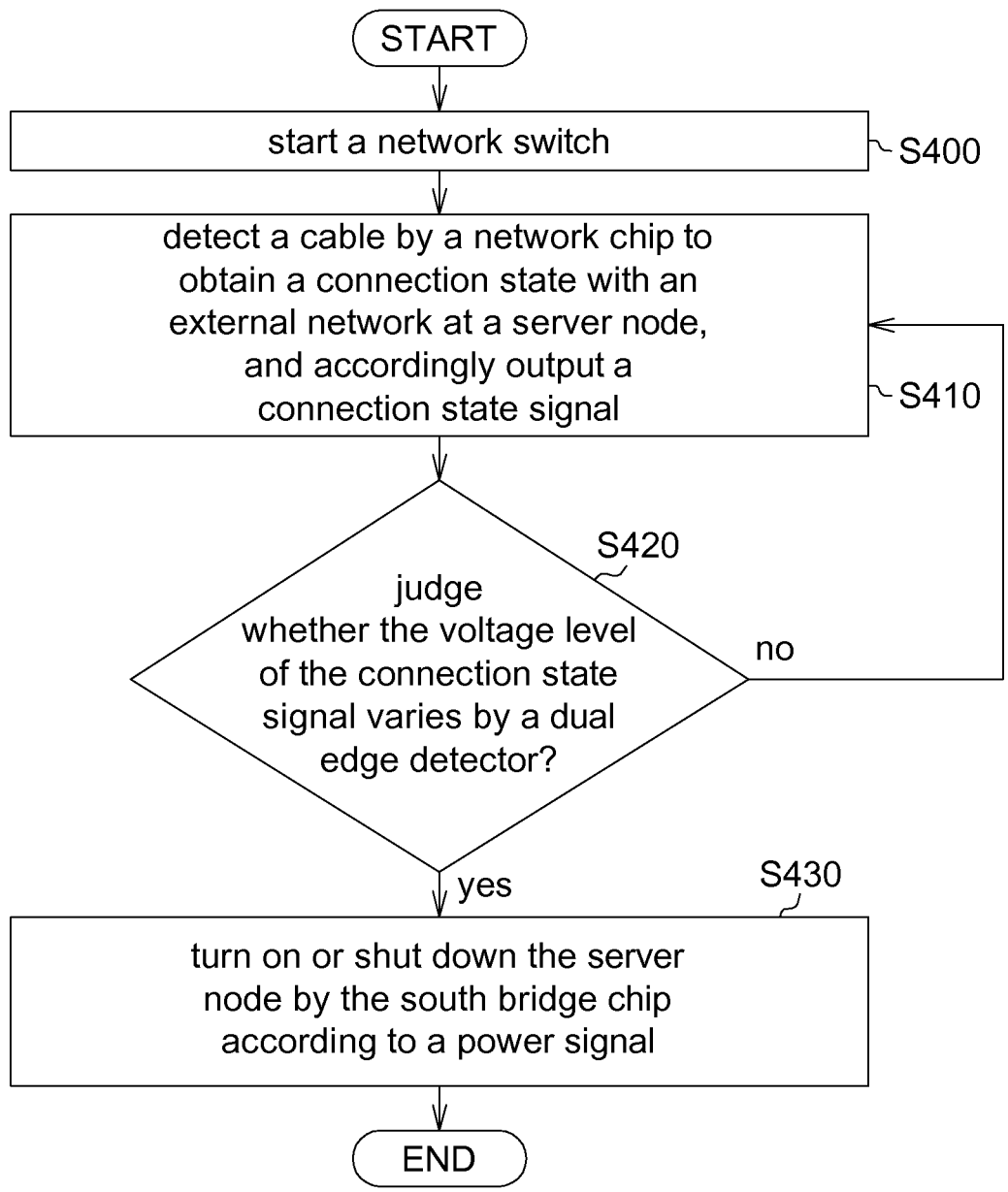
FIG. 3B shows a detailed flowchart of a control mechanism of a server cluster according to another embodiment of the invention.

Referring to FIG. 3B, a detailed flowchart of a control mechanism of a server cluster according to another embodiment of the invention is shown. In step S400, a network switch 110 is started. In step S410, after handshake protocols between the network chip 124 and the network switch 110, a network chip 124 detects a cable 122 connected to a network switch 110 to obtain a connection state with an external network at a server node 120, and accordingly outputs a connection state signal LINK_LED_L. For example, if the connection state signal LINK_LED_L is at a low voltage level, this indicates a connection state; if the connection state signal LINK_LED_L is at a high voltage level, this indicates a disconnection state.

In step S420, whether the voltage level of the connection state signal LINK_LED_L varies is judged by a dual edge detector 134. If no variation occurs, then the process returns to step S410. If the voltage level of the connection state signal LINK_LED_L varies, then the power management unit 130 outputs a power signal PWR_BUT_L according to the connection state signal LINK_LED_L, and the process proceeds to step S430. In step S430, the south bridge chip 138 turns on or shuts down the server node 120 according to the power signal PWR_BUT_L. That is, when the server node 120 is turned off, the south bridge chip 138 turns on the server node 120 if the received power signal PWR_BUT_L is at a low voltage level; when the server node 120 is turned on, the south bridge chip 138 outputs a shutdown signal to shut down the server node 120 if the received power signal PWR_BUT_L is at a low voltage level. If the power signal PWR_BUT_L received by the south bridge chip 138 is at a high voltage level, then no action is generated.

According to the server cluster and the control mechanism thereof disclosed in the above embodiments of the invention, a network connection state at the server node is detected, and the power of the server node is automatically turned on and shut down with a simple logic circuit, so that automatic control is achieved for saving power without using any manual operation or remote-end management server.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of controlling a server cluster, the method comprising:
   determining a connection state of a server node using a network chip operable to communicate with an external network;
   generating, using the network chip, a connection state signal based at least in part on the connection state of the server node;
   determining, using a power management unit of a control unit, a voltage level of the connection state signal;
   determining, using the voltage level of the connection state signal, a connection state of the server node with regard to the external network; and
   generating, using a south bridge chip of the control unit, an operational signal corresponding to the connection state of the server node.

2. The method of claim 1, wherein the server node further comprises a network port operable to communicate with the network chip.

3. The method of claim 1, wherein the connection state comprises an on state of the server node and an off state of the server node.

4. The method of claim 1, wherein the operational signal comprises one of a shutdown signal operable to shut down the server node or a power on signal operable to power on the server node.

5. The method of claim 1, further comprising:
operating the server node based on the operational signal corresponding to the connection state of the server node.

6. The method of claim 1, further comprising determining whether the voltage level of the connection state signal is a first voltage level or a second voltage level, the first voltage level being lower than the second voltage level.

7. The method of claim 6, wherein if the voltage level is determined to be the first voltage level, the server node is off but connected to the external network.

8. The method of claim of 6, wherein if the voltage level is determined to be the second voltage level, the server node is on but not connected to the external network.

9. A method of controlling a server cluster, the method comprising:
determining a connection state of a server node using a network chip operable to communicate with an external network;
generating, using the network chip, a connection state signal based at least in part on the connection state of the server node;
determining, using a power management unit of a control unit, a voltage level of the connection state signal;
determining, using the voltage level of the connection state signal, the server node is disconnected with the external network; and
generating, using a south bridge chip of the control unit, a shutdown signal operable to shut down the server node.

10. The method of claim 9, wherein the voltage level of the connection state signal comprises a first voltage level and a second voltage level, the first voltage level being lower than the second voltage level.

11. The method of claim of 10, wherein the voltage level is determined to be the second voltage level indicating the server node is on but not connected to the external network.

12. A method of controlling a server cluster, the method comprising:
determining a connection state of a server node using a network chip operable to communicate with an external network;
generating, using the network chip, a connection state signal based at least in part on the connection state of the server node;
determining, using a power management unit of a control unit, a voltage level of the connection state signal;
determining, using the voltage level of the connection state signal, the server node is connected with the external network and powered off; and
generating, using a south bridge chip of the control unit, a power on signal operable to power on the server node.

13. The method of claim 12, further comprising:
activating the server node based on the power on signal.

14. The method of claim 12, further comprising determining whether the voltage level of the connection state signal is a first voltage level or a second voltage level, the first voltage level being lower than the second voltage level.

15. The method of claim 14, wherein the voltage level is determined to be the first voltage level.

16. The method of claim of 14, wherein the second voltage level indicates the server node is on but not connected to the external network.

* * * * *